US012754606B1

(12) United States Patent
Lutter

(10) Patent No.: US 12,754,606 B1
(45) Date of Patent: Oct. 6, 2026

(54) ADAPTIVE GAZE ACTIVATION REGIONS FOR VISUAL ELEMENTS

(71) Applicant: Apple Inc., Cupertino, CA (US)

(72) Inventor: Gregory Lutter, Boulder Creek, CA (US)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 18/203,764

(22) Filed: May 31, 2023

Related U.S. Application Data

(60) Provisional application No. 63/347,167, filed on May 31, 2022.

(51) Int. Cl.
*G06F 3/01* (2006.01)

(52) U.S. Cl.
CPC .................................... *G06F 3/013* (2013.01)

(58) Field of Classification Search
CPC .......... G06F 3/011; G06F 3/013; G06F 3/017; G06F 3/0482; G06F 3/04842; G06T 7/55; G06T 7/60; G06T 7/73; G06T 2200/24; G06T 2207/30201
See application file for complete search history.

(56) References Cited

U.S. PATENT DOCUMENTS 10,089,786 B2 10/2018 Liu et al.
10,182,720 B2 1/2019 Hennessey et al.
11,073,904 B2 7/2021 Raghunath et al.
2015/0309570 A1 10/2015 Lankford et al.
2019/0033964 A1* 1/2019 Kulkarni ............. G06F 3/04842
2020/0081527 A1* 3/2020 Agaoglu ................. G06F 3/013
2020/0249750 A1* 8/2020 Choi ................... G06F 3/04812
2021/0088784 A1 3/2021 Whtmire et al.
2022/0400228 A1* 12/2022 Sommerlade .......... H04N 7/144
2023/0128662 A1* 4/2023 Lee ........................... G06T 7/70
345/419

(Continued)

FOREIGN PATENT DOCUMENTS

CN 109324686 A * 2/2019 ............. G06F 3/013

OTHER PUBLICATIONS

English Translation of CN 109324686 A (Year: 2019).*

(Continued)

*Primary Examiner* — Nelson M Rosario
(74) *Attorney, Agent, or Firm* — Fernando & Partners, LLP

(57) ABSTRACT

Various implementations disclosed herein include devices, systems, and methods for determining gaze activation regions for visual elements. In some implementations, a device includes a display, one or more sensors, a non-transitory memory, and one or more processors coupled with the display, the one or more sensors and the non-transitory memory. In various implementations, a method includes displaying, on the display, a plurality of visual elements. In some implementations, the method includes capturing, by the one or more sensors, sensor data. In some implementations, the method includes determining respective gaze activation regions for the plurality of visual elements based on the sensor data. In some implementations, the method includes, in response to a measured gaze target being within one of the respective gaze activation regions, performing a user interface operation associated with a corresponding one of the plurality of visual elements.

17 Claims, 12 Drawing Sheets

(56) References Cited

U.S. PATENT DOCUMENTS

2023/0164508 A1* 5/2023 Shin ........................ G06F 3/165
381/303

OTHER PUBLICATIONS

Nick Babich, "Eye Tracking and Usability: How Does it Work?," Dec. 17, 2019, Retrieved from the Internet: https://xd. adobe. com/ideas/process/user-research/eye-tracking-and-usability, pp. 1-16.
Ryan Whitwam, "Upcoming Dynamic Keyboard Demoed On Video, Uses Intelligent Prediction To Change The Size Of Keys," Sep. 9, 2013, Retrieved from the Internet: https://www.google.com/amp/s/www.androidpolice.com/2013/09/09/upcoming-dynamic-keyboard-demoed-on-video-uses-intelligent-prediction-to-change-the-size-of-keys/%3famp, pp. 1-6.
World of Engineering, @engineers_feed, Sep. 26, 2020, Retrieved from the Internet: https://twitter.com/engineers_feed/status/1309797220951220225?lang=en, 1 Page.

* cited by examiner

300

ADAPTIVE GAZE ACTIVATION REGIONS FOR VISUAL ELEMENTS

CROSS-REFERENCE TO RELATED APPLICATIONS

This application claims the benefit of U.S. Provisional Patent App. No. 63/347,167, filed on May 31, 2022, which is incorporated by reference in its entirety.

TECHNICAL FIELD

The present disclosure generally relates to adaptive gaze activation regions for visual elements.

BACKGROUND

Some devices include a display that presents visual content. Some devices can track a gaze of a user and manipulate the visual content based on an input. Erroneous inputs can trigger a device to manipulate the visual content unexpectedly. Some devices perform various operations based on an input. Erroneous inputs may trigger the device to perform unpredictable operations.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
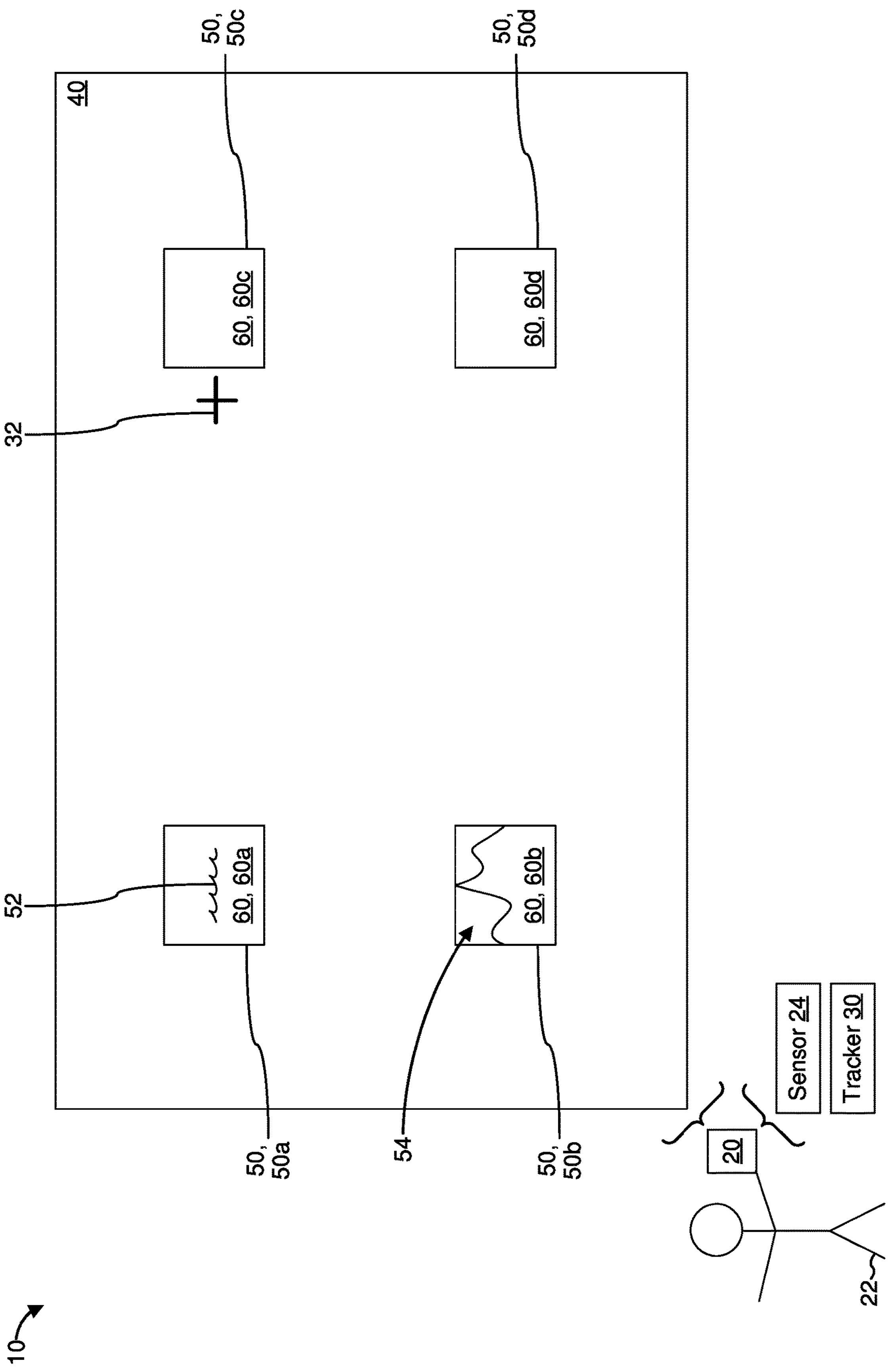
FIGS. 1A-1I are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for determining gaze activation regions for visual elements. In some implementations, a device includes a display, one or more sensors, a non-transitory memory, and one or more processors coupled with the display, the one or more sensors and the non-transitory memory. In various implementations, a method includes displaying, on the display, a plurality of visual elements. In some implementations, the method includes capturing, by the one or more sensors, sensor data. In some implementations, the method includes determining respective gaze activation regions for the plurality of visual elements based on the sensor data. In some implementations, the method includes, in response to a measured gaze target being within one of the respective gaze activation regions, performing a user interface operation associated with a corresponding one of the plurality of visual elements.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Some devices allow a user to select a visual element based on a gaze input. For example, if the user gazes at a visual element for a certain amount of time, the device may determine that the user intends to select the visual element and the device selects the visual element that the user is gazing at. Sometimes a user intends to select a visual element but the device does not detect a gaze input directed to the visual element. As such, the device may not select a visual element even though the user may be gazing at the visual element or at a display location near the visual element.

The present disclosure provides methods, systems, and/or devices for adjusting gaze activation regions of visual elements based on sensor data, historical device usage, user preferences, or the like. The device can use this information to determine which of the visual elements is more likely to be selected by the user. The device can increase the gaze activation region for a visual element that is more likely to be selected by the user. The increased gaze activation region may be larger than the visual element. If the gaze tracking is unreliable and the device detects that the gaze of the user is directed slightly outside the visual element, the device can select the visual element if the gaze is within the expanded gaze activation region of the visual element. Additionally, if the gaze tracking is unreliable, the gaze activation region for a visual element may be increased, the distance between visual elements may be increased, or both.

The sensor data may include an image of a physical environment of the device. The image may include representations of physical entities that are present in the physical environment of the device. The device can determine which of the visual elements the user is more likely to select based on the physical entities that are in the physical environment of the device. For example, if the device is displaying buttons for playing different playlists, the device can determine which of the playlists the user is more likely to play based on the people that are in the physical environment. In this example, the device increases the gaze activation region of a playlist that the user is more likely to play in order to make it easier for the user to select that playlist. As an example, if the device is displaying buttons for a kids playlist and a meditation playlist, the device can determine that the user is more likely to play the kids playlist and increase the gaze activation region for the kids playlist when the image indicates that there are kids in the physical environment.

The sensor data may include audible signal data that indicates a sound in the physical environment of the device. If the device is playing a content item (e.g., a song or a movie) and the audible signal data indicates a change in the ambient sound level of the physical environment, the device may determine that the user is likely to adjust a volume and the device increases the gaze activation region of the volume affordance(s) so that the user can more easily adjust the volume.

The sensor data may include environmental data. As an example, if the sensor data indicates that a temperature of the physical environment is outside a threshold temperature range, the device may determine that the user is likely to adjust a temperature of an HVAC system and the device can increase the gaze activation regions of the temperature control affordances to make it easier for the user to select the temperature control affordances.

The sensor data may indicate a change in an ambient lighting of the physical environment. For example, the sensor data may indicate that a lighting level of the physical environment dropped abruptly (e.g., due to a power outage). In this example, the device may determine that the user is likely to turn on the flashlight and the device increases a gaze activation region of the flashlight affordance.

Adjusting a gaze activation region of a visual element based on sensor data makes it easier for the user to select the visual elements thereby enhancing a user experience of the device. Expanding the gaze activation region of a visual element allows the user to select the visual element even when gaze tracking is adversely impacted and the device determines that the user is gazing at a location near the visual element and not directly at the visual element. Adjusting the gaze activation regions tends to compensate for minor errors in gaze tracking and still allows the user to continue using his/her gaze to select visual elements.

FIG. 1A is a diagram that illustrates an example physical environment 10 in accordance with some implementations. While pertinent features are shown, those of ordinary skill in the art will appreciate from the present disclosure that various other features have not been illustrated for the sake of brevity so as not to obscure more pertinent aspects of the example implementations disclosed herein. To that end, as a non-limiting example, the physical environment 10 includes an electronic device 20 and a user 22 of the electronic device 20.

In some implementations, the electronic device 20 includes a handheld computing device that can be held by the user 22. For example, in some implementations, the electronic device 20 includes a smartphone, a tablet, a media player, a laptop, or the like. In some implementations, the electronic device 20 includes a wearable computing device that can be worn by the user 22. For example, in some implementations, the electronic device 20 includes a head-mountable device (HMD) or an electronic watch. In various implementations, the electronic device 20 includes a set of one or more sensors 24 (hereafter "sensor 24"), a gaze tracker 30 that tracks a gaze of the user 22, and a display that presents an XR environment 40 (e.g., a graphical user interface (GUI) with various GUI elements).

In various implementations, the sensor 24 includes an environmental sensor that captures environmental data that indicates a characteristic of the physical environment 10. For example, in some implementations, the sensor 24 includes an image sensor (e.g., a camera, for example, a visible light camera and/or an infrared camera) that captures images of the physical environment 10. In some implementations, the sensor 24 includes a depth sensor (e.g., a depth camera) that captures depth data related to the physical environment 10. In some implementations, the sensor 24 includes an audio sensor (e.g., a microphone) that receives an audible signal and converts the audible signal to audible signal data. In some implementations, the sensor 24 includes a temperature sensor that records an ambient temperature of the physical environment 10. In some implementations, the sensor 24 includes a humidity sensor that records a humidity level of the physical environment 10. In some implementations, the sensor 24 includes an ambient light sensor (ALS) that records an ambient light level of the physical environment 10.

In various implementations, the sensor 24 includes one or more image sensors. For example, in some implementations, the electronic device 20 includes a smartphone or a tablet, and the sensor 24 includes a front-facing camera that can capture images of an eye of the user 22 while the user 22 is using the electronic device 20. In some implementations, the sensor 24 includes a rear-facing camera that can capture images of a portion of the physical environment 10 that is in a field-of-view of the rear-facing camera. In some implementations, the electronic device 20 includes an HMD, and the sensor 24 includes a user-facing camera that captures an image of the eye of the user 22 while the HMD is mounted on a head of the user 22 and/or a scene-facing camera that can capture images of a portion of the physical environment 10 that is in a field-of-view of the scene-facing camera.

In some implementations, the gaze tracker 30 obtains a set of one or more images (e.g., from the sensor 24). The gaze tracker 30 identifies pixels that correspond to an eye and/or a pupil of the user 22. The gaze tracker 30 tracks the gaze of the user 22 based on pixels that correspond to the eye and/or the pupil of the user 22. The gaze tracker 30 determines a measured gaze target 32 by tracking the gaze of the user 22. In some implementations, the gaze tracker 30 generates a gaze vector that includes a gaze position value, a gaze intensity value and a gaze duration value for the measured gaze target 32. The gaze position value indicates coordinates of the measured gaze target 32 relative to a point of reference within the XR environment 40. The gaze intensity value indicates a number of pixels within the measured gaze target 32 that the user 22 is gazing at. The gaze duration value indicates a time duration for which the user 22 has been gazing at the display region corresponding to the measured gaze target 32. The gaze tracker 30 may also generate a confidence score that represents an accuracy or a reliability of the gaze vector as measured by electronic device 20. In some implementations, the gaze tracker 30 may generate a gaze vector in the form of one or more lines or cones originating from a location associated with the user 22 (e.g., one or both of the user's eyes, the electronic device 20, or the like) and extending out into the XR environment 40. In these implementations, the confidence score associated with the measured gaze vector may be reflected in the angle formed between the cone's vertex and face, with lower confidence scores resulting in larger angles and higher confidence scores resulting in smaller angles.

In the example of FIG. 1A, the XR environment 40 includes various visual elements 50 (e.g., a first visual element 50*a*, a second visual element 50*b*, a third visual element 50*c* and a fourth visual element 50*d*). In some implementations, the visual elements 50 include selectable user interface (UI) elements (e.g., affordances, for example, buttons, icons, etc.) that the user 22 can select by providing a user input (e.g., a gaze input, a touch input, a voice input, etc.). In some implementations, the visual elements 50 include text 52 (e.g., a brief description of a functionality of the first visual element 50*a*). In some implementations, the visual elements 50 include a graphic 54 (e.g., an image, for example, a visual indication of a functionality of the second visual element 50*b*).

In various implementations, the visual elements 50 are associated with corresponding gaze activation regions 60. For example, the first visual element 50*a* is associated with a first gaze activation region 60*a*, the second visual element 50*b* is associated with a second gaze activation region 60*b*, the third visual element 50*c* is associated with a third gaze activation region 60*c*, and the fourth visual element 50*d* is associated with a fourth gaze activation region 60*d*. In the example of FIG. 1A, the gaze activation regions 60 have the same 2D or 3D dimensions as their corresponding visual elements 50. When the measured gaze target 32 is within a particular gaze activation region 60, the electronic device 20 determines that the user 22 intends to select the corresponding visual element 50. In the example of FIG. 1A, since the measured gaze target 32 is outside the third gaze activation region 60*c*, the electronic device 20 determines that user 22 does not intend to select the third visual element 50*c*. As such, in the example of FIG. 1A, the electronic device 20 does not select the third visual element 50*c* even though the user 22 may have intended to select the third visual element 50*c* and may actually be gazing at the third visual element 50*c*.

Figure 1B:
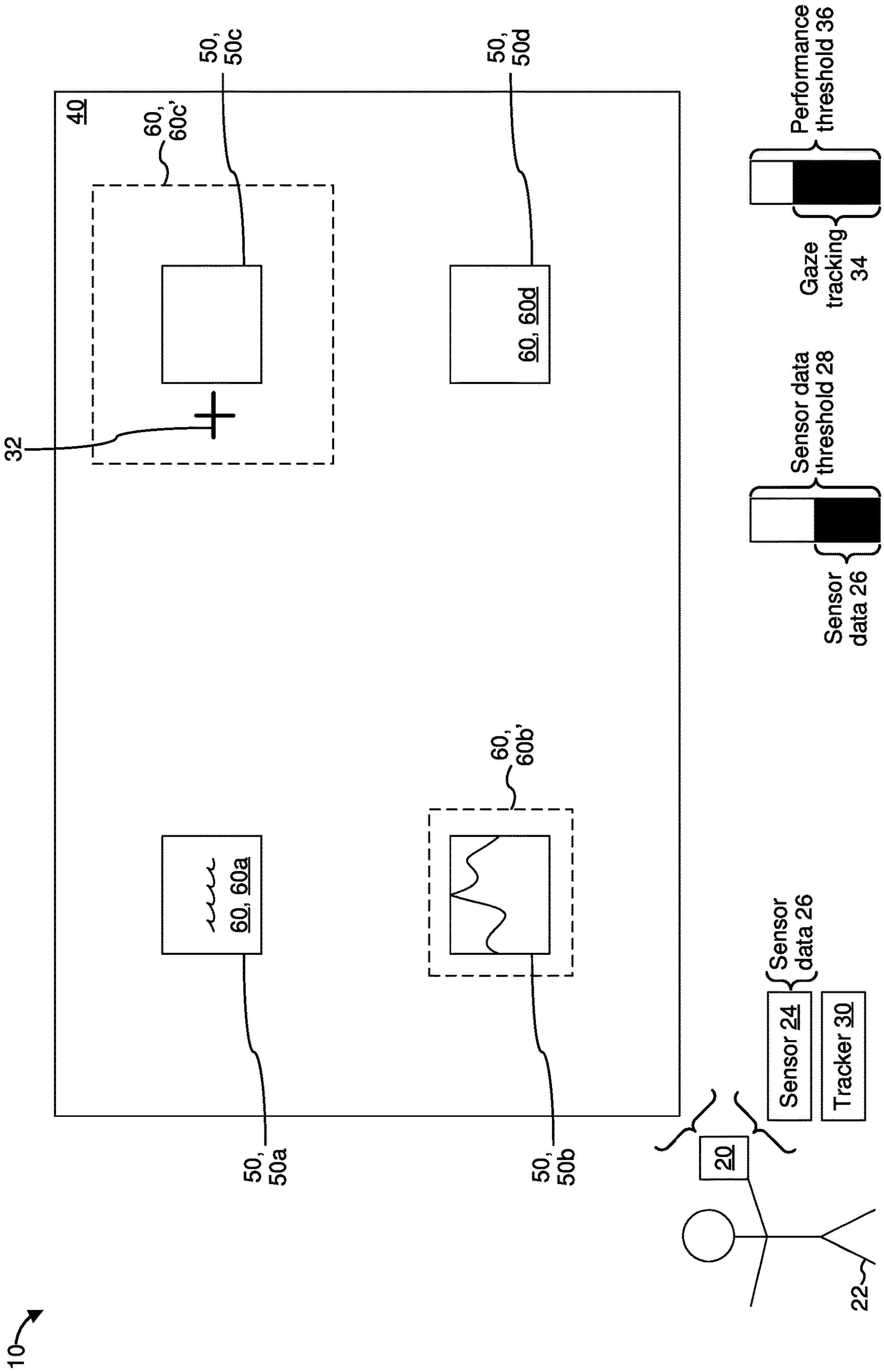

Referring to FIG. 1B, in various implementations, the electronic device 20 determines the gaze activation regions 60 based on sensor data 26 captured by the sensor 24. In some implementations, the electronic device 20 adjusts dimensions of the gaze activation regions 60 based on the sensor data 26. For example, as shown in FIG. 1B, the electronic device 20 has expanded the second gaze activation region 60*b* to an expanded second gaze activation region 60*b*', and the electronic device 20 has expanded the third gaze activation region 60*c* to an expanded third gaze activation region 60*c*' while maintaining dimensions of the first gaze activation region 60*a* and the fourth gaze activation region 60*d*. In the example of FIG. 1B, the measured gaze target 32 is within the expanded third gaze activation region 60*c*'. Since the measured gaze target 32 is within the expanded third gaze activation region 60*c*', the electronic device 20 determines that the user 22 intends to select third visual element 50*c*. As such, in the example of FIG. 1B, the electronic device 20 selects the third visual element 50*c* and performs a user interface operation associated with the third visual element 50*c*.

In various implementations, the electronic device 20 utilizes the sensor data 26 (or other data, such as historical device usage, user preferences, or the like) to determine which of the visual elements 50 the user 22 is likely to select, and the electronic device 20 adjusts dimensions of the gaze activation regions 60 based on determining that the user 22 is more likely to select a particular one of the visual elements 50. In the example of FIG. 1B, the electronic device 20 utilizes the sensor data 26 to determine that the user 22 is most likely to select the third visual element 50*c*. Hence, the electronic device 20 expands the third gaze activation region 60*c* by the greatest amount. The electronic device 20 utilizes the sensor data 26 to determine that the second visual element 50*b* is the second most likely visual element 50 to be selected. Hence, the electronic device 20 expands the second gaze activation region 60*b* by a lesser amount than the third gaze activation region 60*c*. The electronic device 20 utilizes the sensor data 26 to determine that the first visual element 50*a* and the fourth visual element 50*d* are less likely to be selected. Hence, the electronic device 20 does not expand the first gaze activation region 60*a* and the fourth gaze activation region 60*d*. However, electronic device 20 may not reduce the size of the gaze activation regions 60*a* and 60*d* below the dimensions of visual elements 50*a* and 50*d*, respectively.

In various implementations, the electronic device 20 adjusts the gaze activation region(s) 60 based on a comparison of the sensor data 26 with one or more sensor data thresholds 28 (hereafter "sensor data threshold 28"). In some implementations, the electronic device 20 adjusts one or more of the gaze activation regions 60 when the sensor data 26 breaches the sensor data threshold 28. In some implementations, the electronic device 20 adjusts one or more of the gaze activation regions 60 when a value indicated by the sensor data 26 is below a value indicated by the sensor data threshold 28. In some implementations, the electronic device 20 adjusts one or more of the gaze activation regions 60 when a value indicated by the sensor data 26 is greater than a value indicated by the sensor data threshold 28.

In some implementations, the electronic device 20 determines a gaze tracking performance 34 that indicates an accuracy and/or a reliability of the gaze tracker 30. The electronic device 20 compares the gaze tracking performance 34 with a performance threshold 36. If the gaze tracking performance 34 is below the performance threshold 36, the electronic device 20 adjusts one or more of the gaze activation regions 60 based on the sensor data 26 in order to compensate for the difference between the gaze tracking performance 34 and the performance threshold 36. If the gaze tracking performance 34 is greater than the performance threshold 36, the electronic device 20 may not adjust the gaze activation regions 60. In some implementations, an amount of adjustment to a gaze activation region 60 is a function of (e.g., proportional to) a difference between the gaze tracking performance 34 and the performance threshold 36. The electronic device 20 can determine the gaze tracking performance 34 based on a combination of gaze inputs, touch inputs, gesture inputs and/or voice inputs. For example, if the electronic device 20 detects a touch input, a gesture input or a voice input to select the third visual element 50*c* after detecting the measured gaze target 32 near the third visual element 50*c*, then the electronic device 20 can determine that the gaze tracker 30 is not tracking the gaze of the user 22 accurately.

Figure 1C:
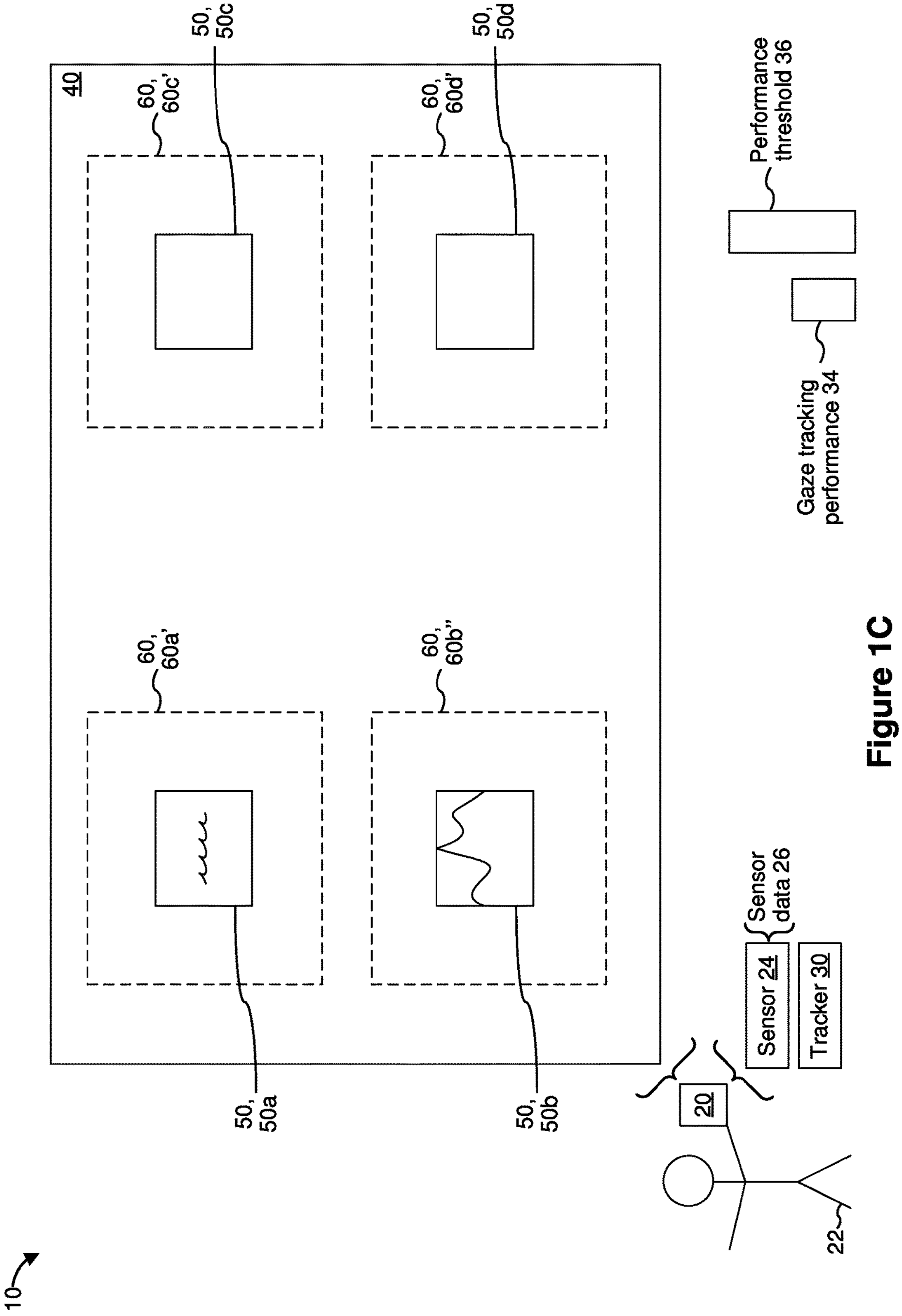

Referring to FIG. 1C, in some implementations, the electronic device 20 adjusts the gaze activation regions 60 of multiple (e.g., all) of the visual elements 50*c* in response to the gaze tracking performance 34 being less than the performance threshold 36. As illustrated in FIG. 1C, the electronic device 20 expands the first gaze activation region 60*a* to an expanded first gaze activation region 60*a*', the second gaze activation region 60*b* to an expanded second gaze activation region 60*b*", the third gaze activation region 60*c* to the expanded third gaze activation region 60*c*' and the fourth gaze activation region 60*d* to an expanded fourth gaze activation region 60*d*'. When the gaze tracking performance 34 is below the performance threshold 36, expanding the gaze activation regions 60 can ameliorate (e.g., reduce or eliminate) the performance deficiency of the gaze tracker 30. In some implementations, a nearest neighbor fill algorithm may be used to determine the expanded gaze activation regions for the visual elements in screen space.

Figure 1D:
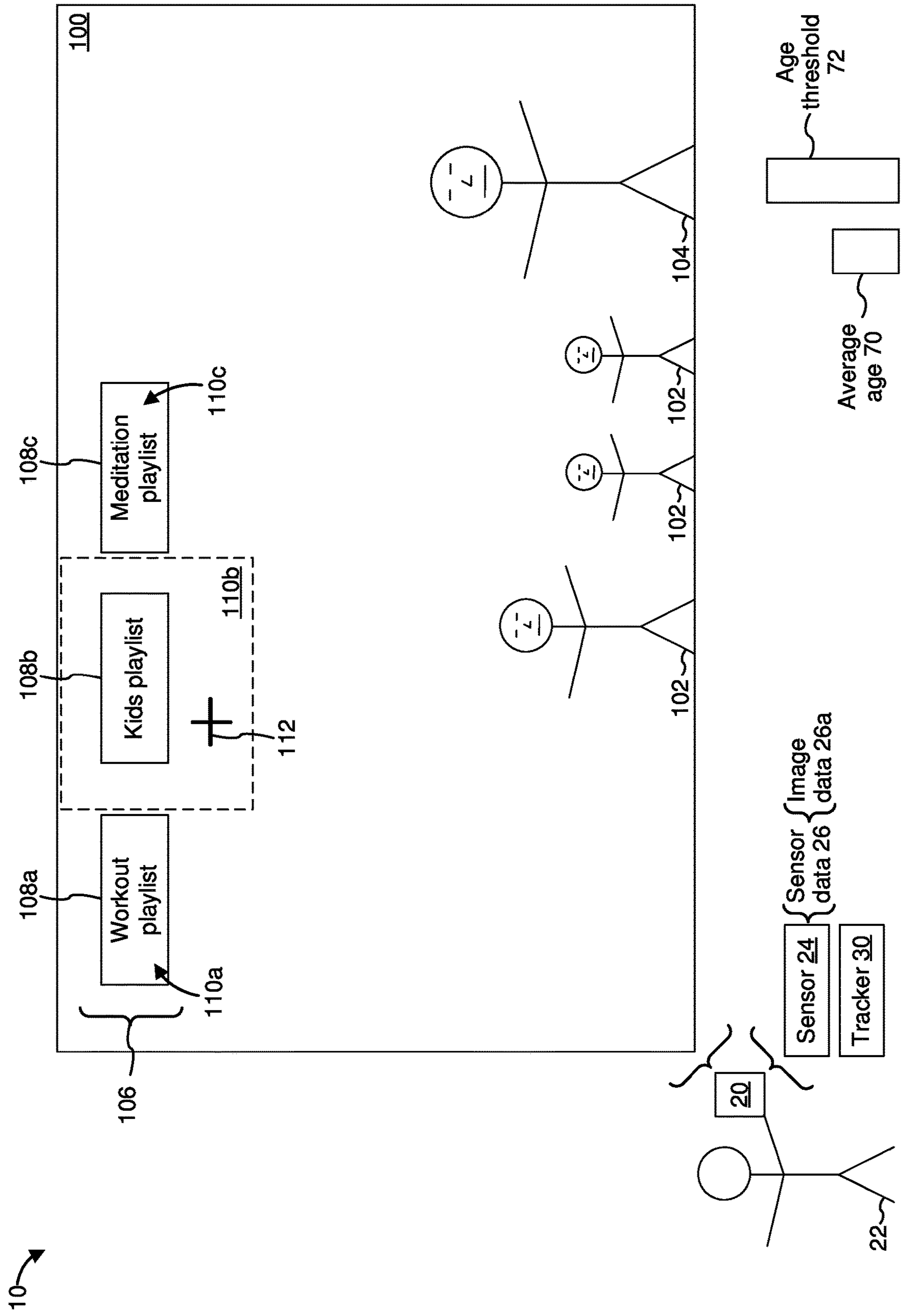

Referring to FIG. 1D, in some implementations, the electronic device 20 presents an XR environment 100 that is a pass-through (e.g., by displaying images captured by a forward-facing camera of electronic device 20 or viewed through a transparent or translucent display) of the physical environment 10. In the example of FIG. 1D, the physical environment 10 includes three kids and an adult (not shown) and the XR environment 100 includes XR representations 102 of the kids and an XR representation 104 of the adult. Additionally, the electronic device 20 overlays a music user interface 106 that allows the user 22 to control a music application installed on the electronic device 20. The music user interface 106 includes a workout playlist affordance 108*a* for playing a workout playlist, a kids playlist affordance 108*b* for playing a kids playlist and a meditation playlist affordance 108*c* for playing a meditation playlist. The affordances 108*a*, 108*b* and 108*c* have corresponding gaze activation regions 110*a*, 110*b* and 110*c* that the user 22 can gaze at in order to play the appropriate playlist. By default, the gaze activation regions 110*a*, 110*b* and 110*c* may be of the same size as their corresponding affordances 108*a*, 108*b* and 108*c*, respectively. However, in the example of FIG. 1D, the electronic device 20 has expanded the gaze activation region 110*b* for the kids playlist affordance 108*b* because the electronic device 20 has determined that the user 22 is more likely to activate the kids playlist than the workout playlist or the meditation playlist based on the presence of the kids in the physical environment 10.

In the example of FIG. 1D, the sensor data 26 includes image data 26*a* (e.g., one or more images of the physical environment 10). The electronic device 20 performs instance segmentation and/or semantic segmentation on the image data 26*a* to identify the kids and the adult represented by the XR representations 102 and 104. The electronic device 20 estimates ages of the people represented by the XR representations 102 and 104. The electronic device 20 determines an average age 70 by averaging the estimated ages of the people in the environment. The electronic device 20 compares the average age 70 to an age threshold 72. If the average age 70 is less than the age threshold 72, the electronic device 20 determines that the user 22 is more likely to play the kids playlist by selecting (e.g., gazing at) the kids playlist affordance 108*b*. Hence, the electronic device 20 expands the gaze activation region 110*b* of the kids playlist affordance 108*b* to make it easier for the user 22 to select the kids playlist. When the electronic device 20 detects a measured gaze target 112 within the expanded gaze activation region 110*b* for the kids playlist affordance 108*b*, the electronic device 20 begins playing the kids playlist. If the electronic device 20 had not expanded the gaze activation region 110*b* for the kids playlist affordance 108*b*, then the measured gaze target 112 would not have triggered the electronic device 20 to play the kids playlist.

Figure 1E:
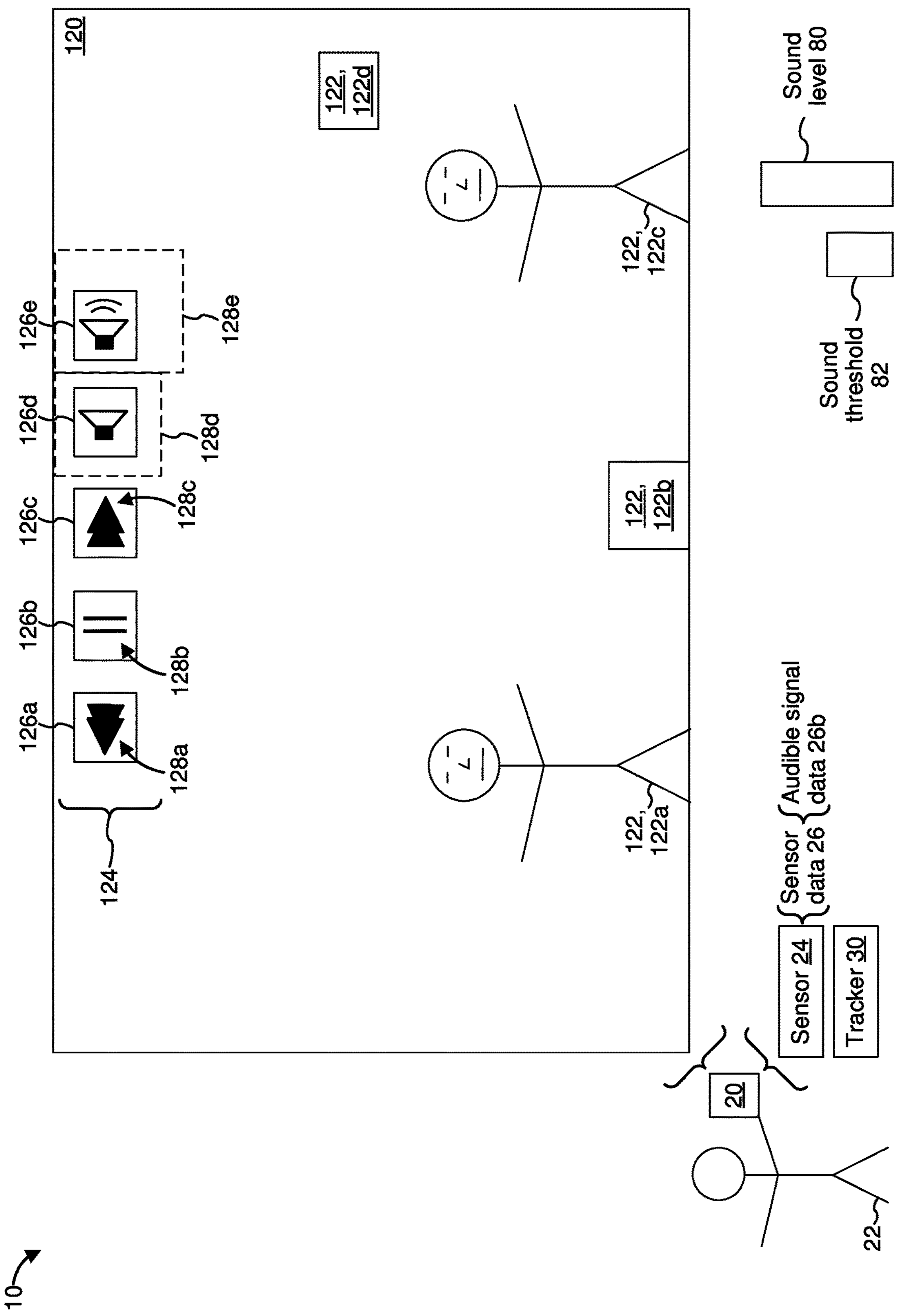

Referring to FIG. 1E, the electronic device 20 plays a media content item 120 (e.g., a video content item such as a movie, a TV show, etc.). The media content item 120 depicts various action-performing elements 122 that are depicted as performing actions. In the example of FIG. 1E, the action-performing elements 122 include a first action FIG. 122*a*, a robot 122*b*, a second action FIG. 122*c* and a drone 122*d*. The electronic device 20 overlays a media control interface 124 while the media content item 120 is being presented. The media control interface 124 includes various selectable affordances (e.g., buttons) for controlling the playback of the media content item 120. For example, the media control interface 124 includes a rewind affordance 126*a* for rewinding, a pause affordance 126*b* for pausing, a fast forward affordance 126*c* for fast forwarding, a decrease volume affordance 126*d* for decreasing a volume and an increase volume affordance 126*e* for increase the volume.

The affordances 126*a*, . . . , and 126*e* are associated with respective gaze activation regions 128*a*, . . . , and 128*e*. By default, the gaze activation regions 128*a*, . . . , and 128*e* may be of the same size as their corresponding affordances 126*a*, . . . , and 126*e*, respectively. However, in the example of FIG. 1E, the electronic device 20 has expanded the gaze activation region 128*d* for the decrease volume affordance 126*d* by a first amount, and expanded the gaze activation region 128*e* for the increase volume affordance 126*e* by a second amount that is greater than the first amount. The electronic device 20 has expanded the gaze activation regions 128*d* and 128*e* for the decrease volume affordance 126*d* and the increase volume affordance 126*e*, respectively, in response to obtaining audible signal data 26*b* indicating that a sound level 80 of the physical environment 10 is greater than a sound threshold 82. When the sound level 80 of the physical environment 10 breaches the sound threshold 82, the user 22 may want to increase the volume of the electronic device 20 so that the user 22 is able to hear an audio track of the media content item 120 that the electronic device 20 is currently playing. Increasing the gaze activation region 128*e* for the increase volume affordance 126*e* makes it easier for the user 22 to select the increase volume affordance 126*e* via gaze. Alternatively, when the sound level 80 of the physical environment 10 exceeds the sound threshold 82, the user 22 may want to decrease the volume of the electronic device 20 so that the user 22 is able to listen to the sound from the physical environment 10. Increasing the gaze activation region 128*d* for the decrease volume affordance 126*d* makes it easier for the user to select the decrease volume affordance 126*d* via gaze. The electronic device 20 increases the gaze activation region 128*e* of the increase volume affordance 126*e* by a greater amount than the gaze activation region 128*d* of the decrease volume affordance 126*d* because the electronic device 20 determines that the user 22 is more likely to increase the volume than decrease the volume (e.g., based on historical device usage data indicating that the user 22 tends to increase the volume when the ambient sound level increases).

Figure 1F:
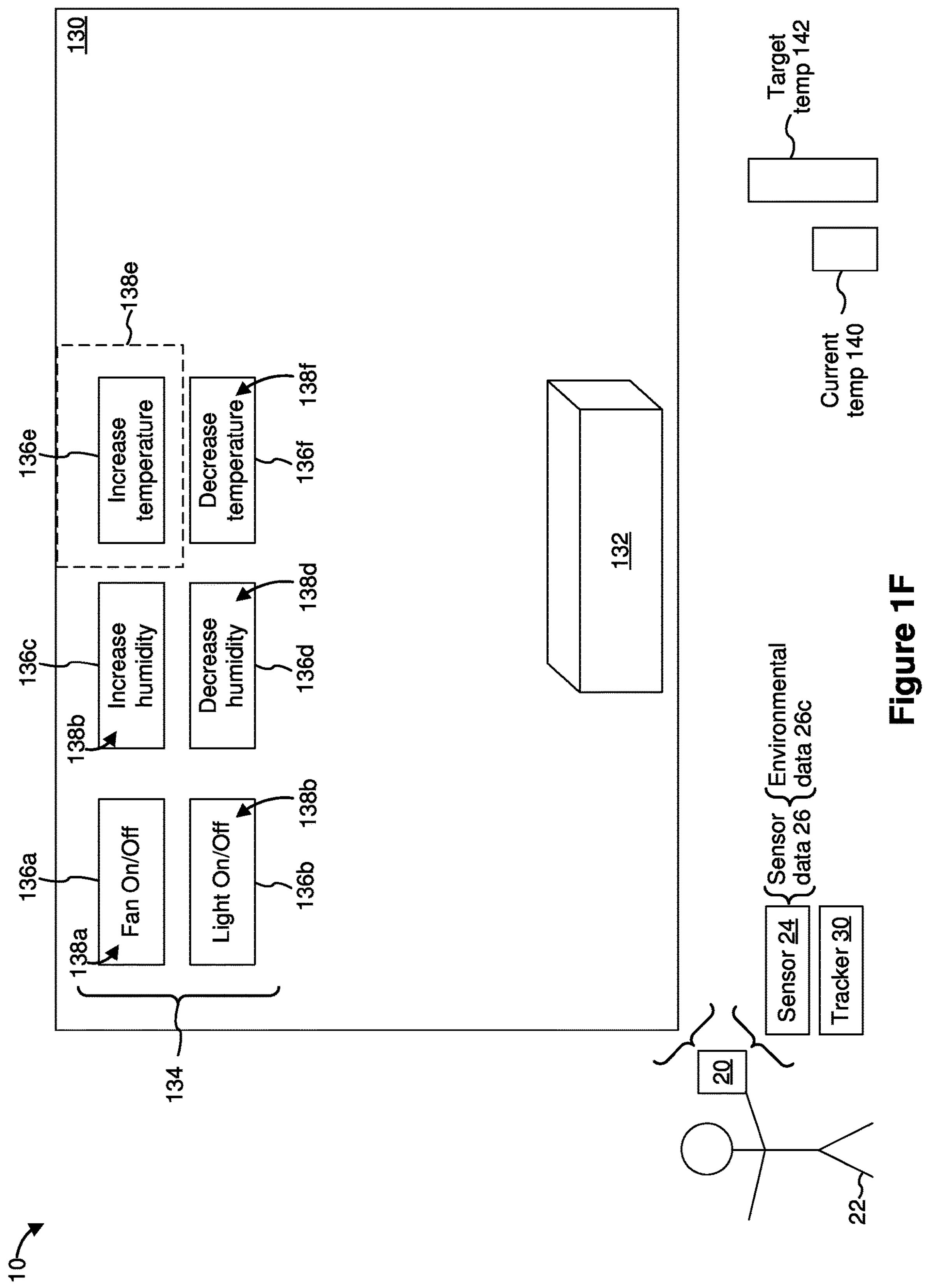

Referring to FIG. 1F, the electronic device 20 presents an XR environment 130 that includes an XR object 132. The XR environment 130 may be a pass-through of the physical environment and the XR object 132 may represent a physical article such as a couch in a living room. The electronic device 20 overlays an environment control interface 134 that includes various selectable affordances for controlling various aspects of the physical environment 10. In the example of FIG. 1F, the environment control interface 134 includes a fan switch 136*a* for switching a physical fan on or off, a light switch 136*b* for switching a physical light on or off, an increase humidity affordance 136*c* for increasing a humidity of the physical environment 10, a decrease humidity affordance 136*d* for decreasing the humidity of the physical environment 10, an increase temperature affordance 136*e* for increasing a temperature of the physical environment 10, and a decrease temperature affordance 136*f* for decreasing the temperature of the physical environment 10. The affordances 136*a*, . . . , and 136*f* are associated with corresponding gaze activation regions 138*a*, . . . , and 138*f*. By default, the gaze activation regions 138*a*, . . . , and 138*f* may be of the same size as their corresponding affordances 136*a*, . . . , and 136*f*, respectively. However, in the example of FIG. 1F, the electronic device 20 has expanded the gaze activation region 138*e* for the increase temperature affordance 136*e* based on environmental data 26*c* indicating that a current temperature 140 of the physical environment 10 is less than a target temperature 142 (e.g., a preferred temperature or a recommended temperature). Since the current temperature 140 is less than the target temperature 142, the electronic device 20 determines that the user 22 is likely to select the increase temperature affordance 136*e*. Increasing the gaze activation region 138*e* for the increase temperature affordance 136*e* makes it easier for the user 22 to activate the increase temperature affordance 136*e* via gaze.

Figure 1G:
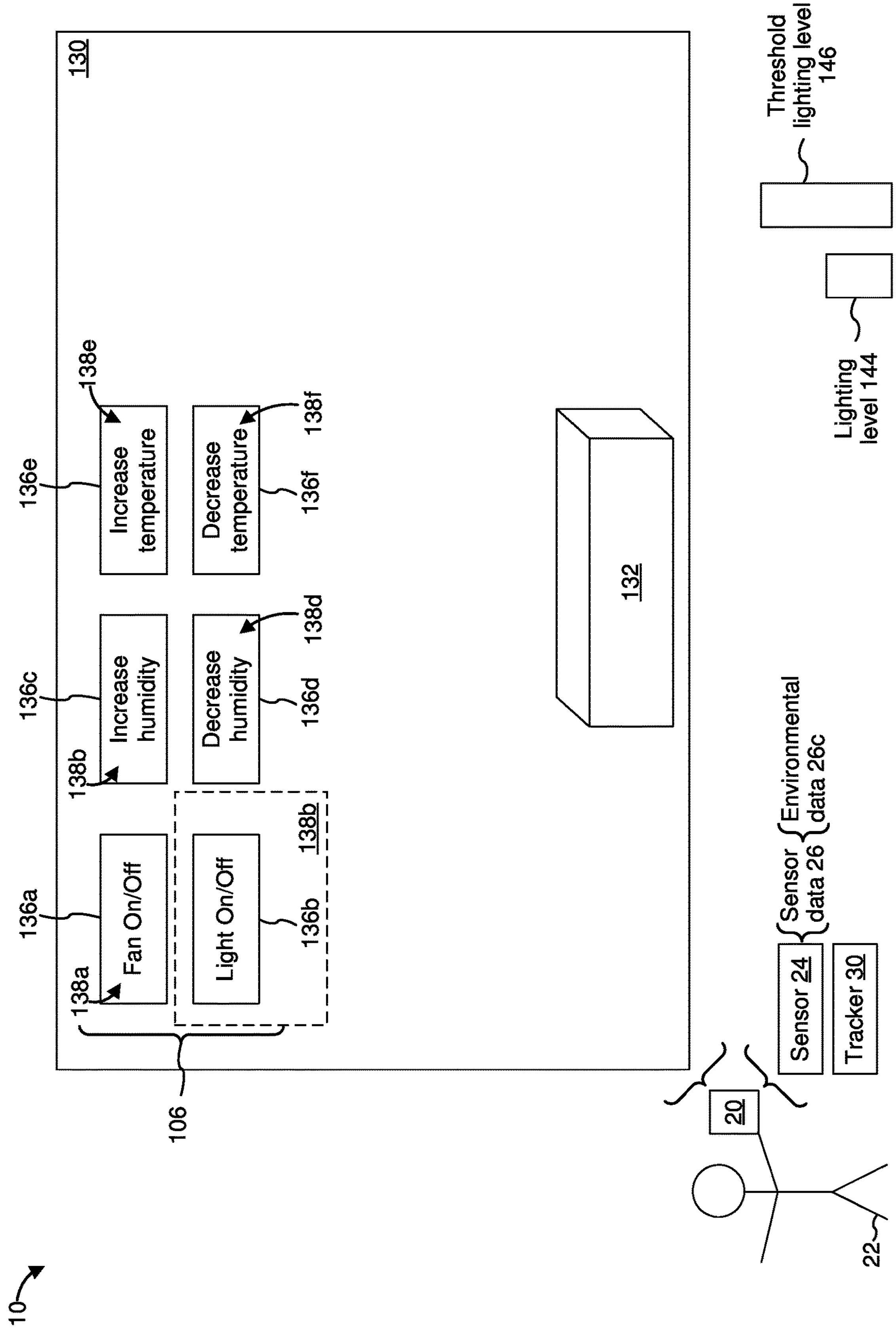

Referring to FIG. 1G, in some implementations, the environmental data 26*c* indicates that a lighting level 144 of the physical environment 10 is less than a threshold lighting level 146 (e.g., due to sun down or due to cloud cover). The electronic device 20 determines that the user 22 is likely to activate the light switch 136*b* in order to increase the lighting level 144 to a value that is greater than the threshold lighting level 146. As such, the electronic device 20 increases the gaze activation region 138*b* for the light switch 136 in order to make it easier for the user 22 to activate the light switch 136*b* via gaze.

Figure 1H:
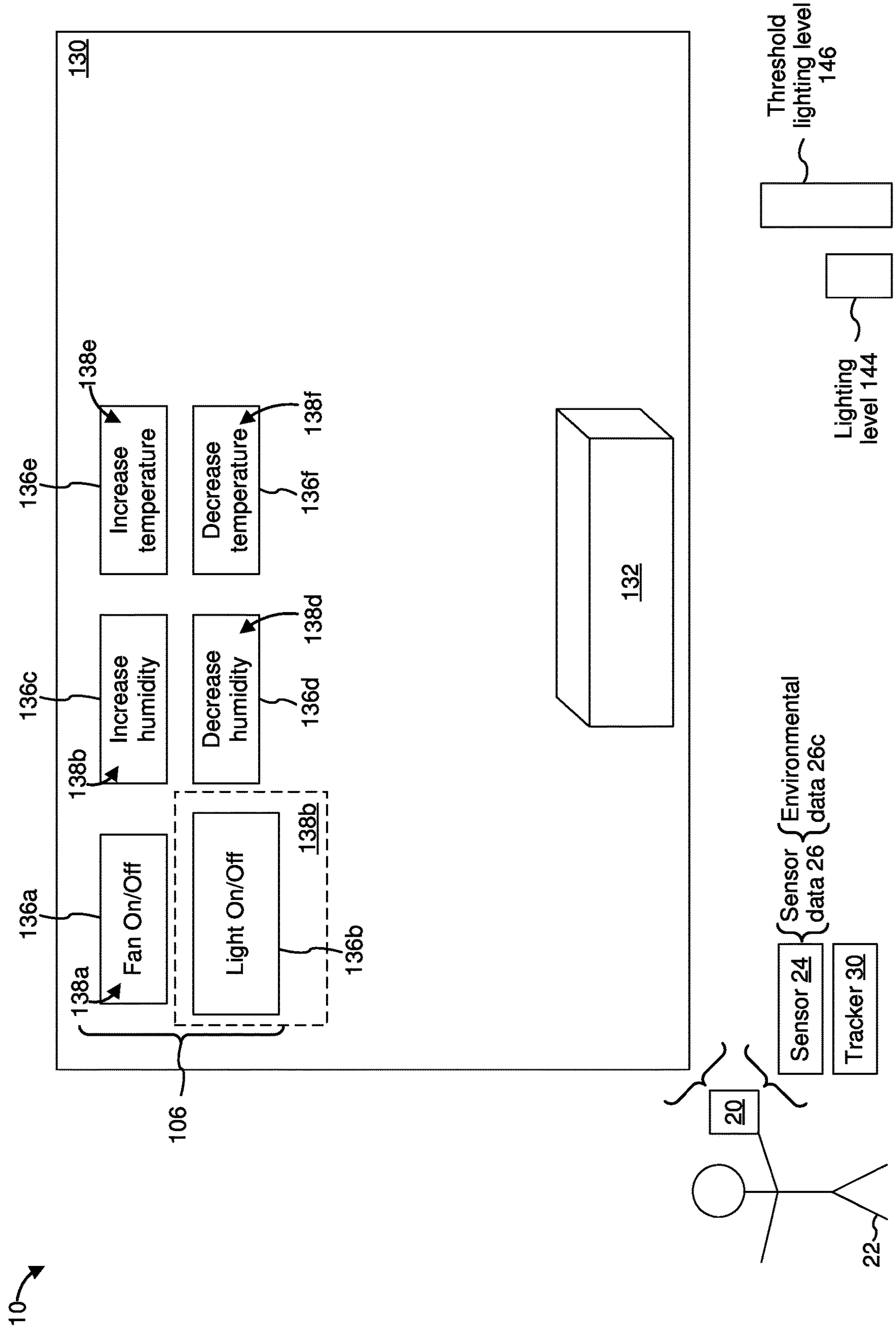

Referring to FIG. 1H, in some implementations, the electronic device 20 increases a size of the light switch 136*b* in addition to increasing the gaze activation region 138*b* for the light switch 136*b*. Increasing the size of the light switch 136*b* may serve as an indication to the user that the gaze activation region 138*b* of the light switch 136*b* has been expanded since the user 22 expects the gaze activation region 138*b* to span at least through the dimensions of the light switch 136*b*. More generally, in various implementations, the electronic device 20 increases a size of a visual element that the electronic device 20 expects the user 22 to select in addition to increasing a gaze activation region of the visual element. In some implementations, the electronic device 20 may increase the size of a visual element by an amount that is the same or less than the amount of size increase of its corresponding gaze activation region.

Figure 1I:
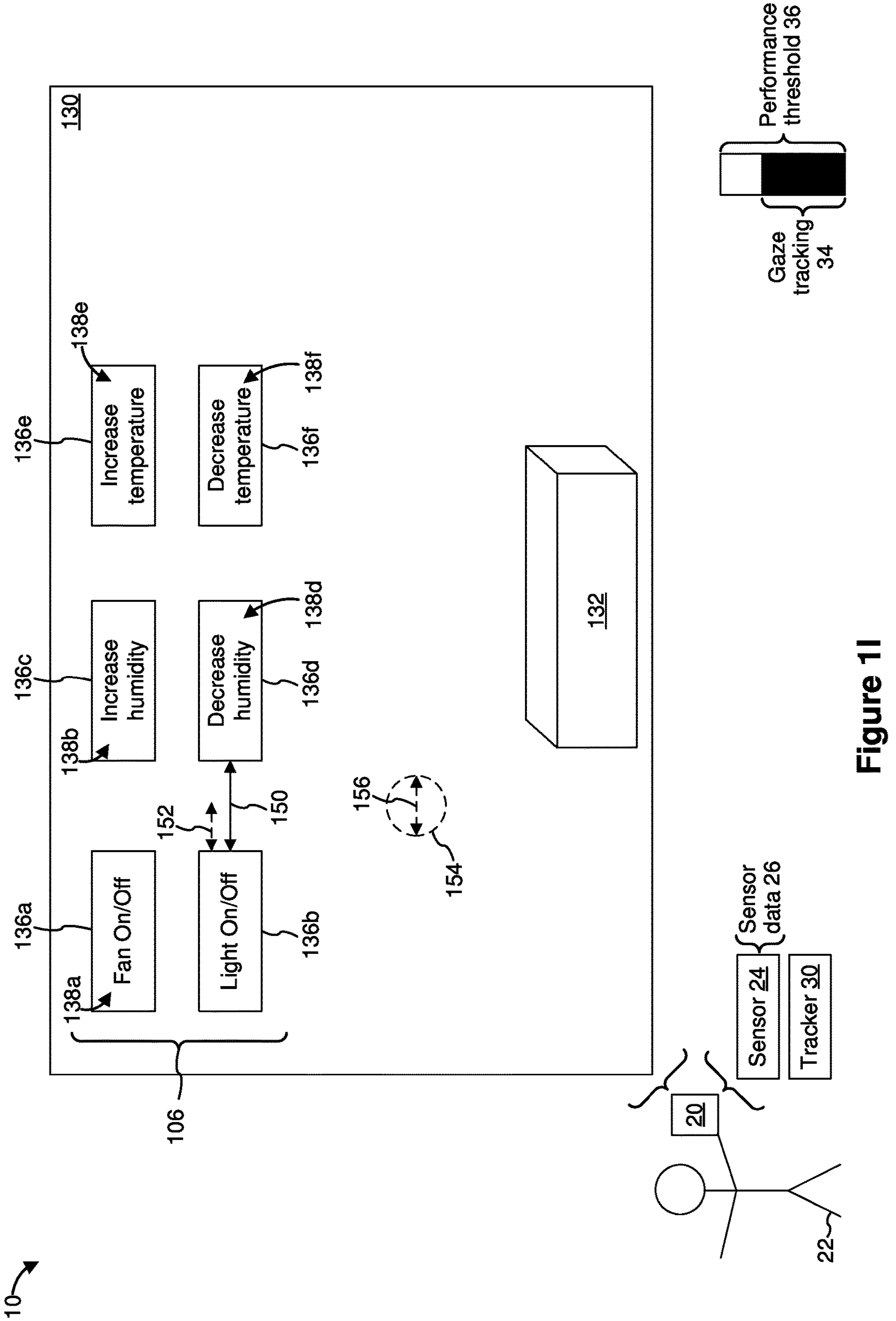

Referring to FIG. 1I, in some implementations, the electronic device 20 increases a spacing between the visual elements. For example, the electronic device 20 displays the affordances 136*a*, . . . , and 136*f* with an increased spacing 150 that is greater than a previous spacing 152. In some implementations, the electronic device 20 displays the affordances 136*a*, . . . , and 136*f* with the increased spacing 150 based on a size of a gaze cone 154 (e.g., based on a diameter 156 of the gaze cone 154). In some implementations, the increased spacing 150 is greater than the diameter 156 of the gaze cone 154 so that the gaze cone 154 does not overlap with multiple affordances 136*a*, . . . , and 136*f*. In some implementations, the diameter 156 of the gaze cone 154 is a function of the gaze tracking performance 34. The diameter 156 of the gaze cone 154 may be inversely related to the gaze tracking performance 34. For example, the lower the gaze tracking performance 34, the greater the diameter 156 of the gaze cone 154.

While affordances and associated gaze activation regions are shown in 2D, it should be appreciated that they may be 3D volumes. For example, the affordances may be 3D blocks (e.g., 3D cubes) and their associated gaze activation regions may be 3D blocks that are at least as large as the affordances. As an example, an affordance may be a first 3D block and its associated gaze activation may be a second 3D block that encapsulates the first 3D block. Other 3D volumes are also contemplated. For example, an affordance and its associated gaze activation region may be spherical, cylindrical, conical, pyramidical, cubical, toroidal, prismatic, etc.

Figure 2:
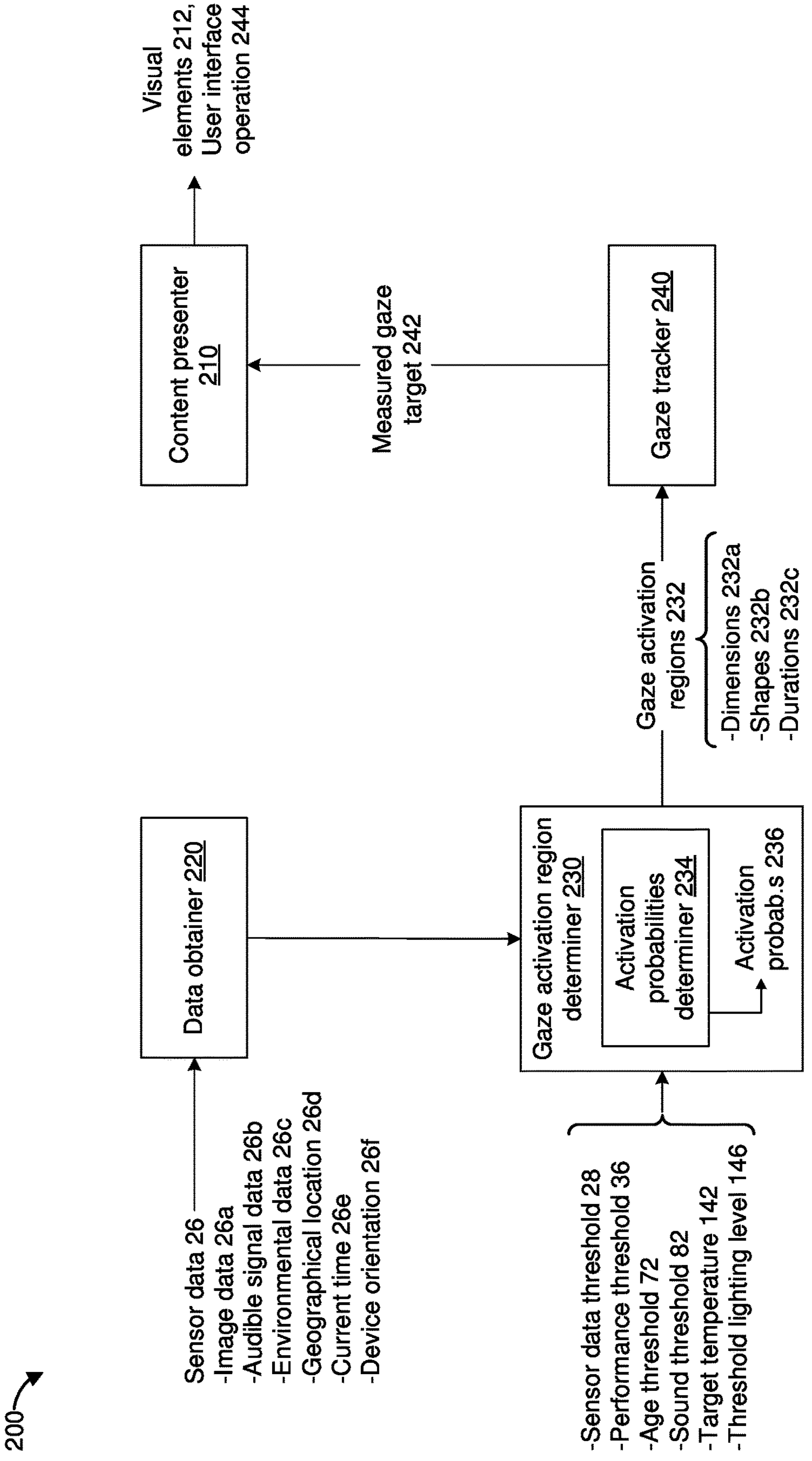
FIG. 2 is a block diagram of a system that determines gaze activation regions for visual elements in accordance with some implementations.

FIG. 2 is a block diagram of a system 200 that determines gaze activation regions for visual elements (e.g., the gaze activation regions 60 shown in FIGS. 1A-1C, the gaze activation regions 110*a*, 110*b* and 110*c* shown in FIG. 1D, the gaze activation regions 128*a*, . . . , and 128*e* shown in FIG. 1E, and the gaze activation regions 138*a*, . . . , and 138*f* shown in FIGS. 1F-1I). In some implementations, the system 200 includes a content presenter 210, a data obtainer 220, a gaze activation region determiner 230 and a gaze tracker 240 (e.g., the gaze tracker 30 shown in FIGS. 1A-1I). In various implementations, the system 200 resides at (e.g., is implemented by) the electronic device 20 shown in FIGS. 1A-1I.

In various implementations, the content presenter 210 presents a set of visual elements 212 (e.g., the visual elements 50 shown in FIGS. 1A-1C, the affordances 108*a*, 108*b* and 108*c* shown in FIG. 1D, the affordances 126*a*, . . . , and 126*e* shown in FIG. 1E, and the affordances 136*a*, . . . , and 136*f* shown in FIGS. 1F-1I). In some implementations, the content presenter 210 overlays the set of visual elements 212 on an XR environment.

In various implementations, the data obtainer 220 obtains the sensor data 26 from the sensor 24 shown in FIG. 1A-1I. In some implementations, the sensor data 26 includes the image data 26*a*, the audible signal data 26*b* and/or the environmental data 26*c*. In some implementations, the sensor data 26 indicates a geographical location 26*d* that the data obtainer 220 obtains from a location sensor. In some implementations, the sensor data 26 indicates a current time 26*e* that the data obtainer 220 obtains from a time sensor (e.g., a system clock). In some implementations, the sensor data 26 indicates a device orientation 26*f* that the data obtainer 220 obtains from an orientation sensor (e.g., from an inertial measurement unit (IMU)).

In various implementations, the gaze activation region determiner 230 determines gaze activation regions 232 based on the sensor data 26. In some implementations, the gaze activation region determiner 230 includes an activation probabilities determiner 234 that computes activation probabilities 236 for the visual elements 212 based on the sensor data 26. The activation probabilities 236 indicate respective likelihoods of the user activating the corresponding visual elements 212. In some implementations, the visual element 212 with the greatest activation probability 236 has the greatest likelihood of being activated by the user. As such, the gaze activation region determiner 230 can expand the gaze activation region 232 of the visual element 212 with the greatest activation probability 236 in order to make it easier for the user to activate the visual element 212 with the greatest activation probability 236. In various implementations, the gaze activation region determiner 230 determines the gaze activation regions 232 such that the gaze activation regions 232 for the visual elements 212 are proportional to their respective activation probabilities 236. The activation probabilities 236 may be referred to as selection probabilities or as selection likelihood scores.

In some implementations, the gaze activation region determiner 230 determines respective dimensions 232*a*, respective shapes 232*b* and/or respective time durations 232*c* for the gaze activation regions 232. While FIGS. 1A-1I illustrates gaze activation regions with shapes that are the same as the corresponding visual elements, in some implementations, the shapes 232*b* of the gaze activation regions 232 may be different from the shapes of their corresponding visual elements 212. For example, a rectangular visual element 212 may have a square-shaped gaze activation region 232 in order to increase a likelihood of the rectangular visual element 212 being selected. As another example, a rectangular visual element 212 may have a circular-shaped gaze activation region 232, an oval-shaped gaze activation region 232 or a gaze activation region 232 with an irregular shape. In some implementations, the gaze activation regions 232 may be associated with the time durations 232*c*. For example, the dimensions 232*a* and/or the shapes 232*b* of the gaze activation regions 232 may change after the time durations 232*c* elapse. In some implementations, the dimensions 232*a* and/or the shapes 232*b* of the gaze activation regions 232 change as the sensor data 26 changes. As such, the gaze activation region determiner 230 adapts the gaze activation regions 232 based on changes in values of the sensor data 26.

In various implementations, the gaze activation region determiner 230 determines the gaze activation regions 232 based on a relation between the sensor data 26 and the sensor data threshold 28. For example, the activation probabilities 236 of the visual elements 212 may be a function of a difference between a value indicated by the sensor data 26 and a value specified by the sensor data threshold 28. Consequently, the dimensions 232*a* of one or more of the visual elements 212 may be a function of the difference between the sensor data 26 and the sensor data threshold 28. In some implementations, the sensor data 26 indicates the gaze tracking performance 34, and the dimensions 232*a* of the gaze activation regions 232 are a function of a difference between the gaze tracking performance 34 and the performance threshold 36. For example, greater differences between the gaze tracking performance 34 and the performance threshold 36 result in larger dimensions for one or more of the gaze activation regions 232.

In some implementations, the sensor data 26 indicates a characteristic of a physical environment, and the gaze activation region determiner 230 determines the gaze activation regions 232 based on a difference between the characteristic and a threshold characteristic. For example, the sensor data 26 may indicate an average age of people in the physical environment, and the gaze activation region determiner 230 determines the gaze activation regions 232 based on a difference between the average age of the people in the physical environment and the age threshold 72. As another example, the sensor data 26 may indicate a sound level of the physical environment, and the gaze activation region determiner 230 determines the gaze activation regions 232 based on a difference between the sound level and the sound threshold 82. As yet another example, the sensor data 26 may indicate a current temperature of the physical environment, and the gaze activation region determiner 230 determines the gaze activation regions 232 based on a difference between the current temperature and the target temperature 142. As a further example, the sensor data 26 may indicate a lighting level of the physical environment, and the gaze activation region determiner 230 determines the gaze activation regions 232 based on a difference between the lighting level 144 and the threshold lighting level 146.

In some implementations, the sensor data 26 indicates the geographical location 26*d* of the device, and the gaze activation region determiner 230 determines the gaze activation regions 232 based on the geographical location 26*d*.

In some implementations, the gaze activation regions 232 are based on a distance between the geographical location 26*d* and a home location of the device stored in a network element such as a home location register (HLR). As an example, the gaze activation regions 232 of icons for travel-related applications (e.g., a ride-sharing application, an airline application, a hotel application, etc.) can be increased when the geographical location 26*d* indicates that the user is traveling outside the home location.

In some implementations, the sensor data 26 indicates the current time 26*e*, and the gaze activation region determiner 230 determines the gaze activation regions 232 based on the current time 26*e*. In some implementations, the gaze activation regions 232 of icons for applications that have historically been used at times that match the current time 26*e* can be increased. For example, the gaze activation regions 232 of icons for entertainment-related applications (e.g., a sports application, a video streaming application, an audiobook application, etc.) can be increased during evenings if historical device usage data indicates that the user uses entertainment-related applications during evenings.

In some implementations, the sensor data 26 indicates the device orientation 26*f*, and the gaze activation region determiner 230 determines the gaze activation regions 232 based on the device orientation 26*f*. In some implementations, the gaze activation regions 232 of icons for applications that have historically been used when a device orientation matched the device orientation 26*f* can be increased. For example, the gaze activation region 232 of an icon for a video streaming application can be increased if historical device usage data indicates that the user launches the video streaming application after orienting the device into the device orientation 26*f*.

In various implementations, the gaze tracker 240 determines a measured gaze target 242 (e.g., the measured gaze target 32 shown in FIGS. 1A and 1B, and/or the measured gaze target 112 shown in FIG. 1D). In various implementations, the content presenter 210 determines whether the measured gaze target 242 is within one of the gaze activation regions 232. If the measured gaze target 242 is within a gaze activation region 232 of a particular visual element 212, the content presenter 210 performs a user interface operation 244 associated with that particular visual element 212.

In some implementations, the gaze activation region determiner 230 alternatively or additionally determines the gaze activation regions 232 based on information associated with the user, such as historical device usage, user preferences, contact information, calendar events, social media accounts, or any other types of information that may provide an indication as to which of several visual elements a user is more likely to select.

Figure 3:
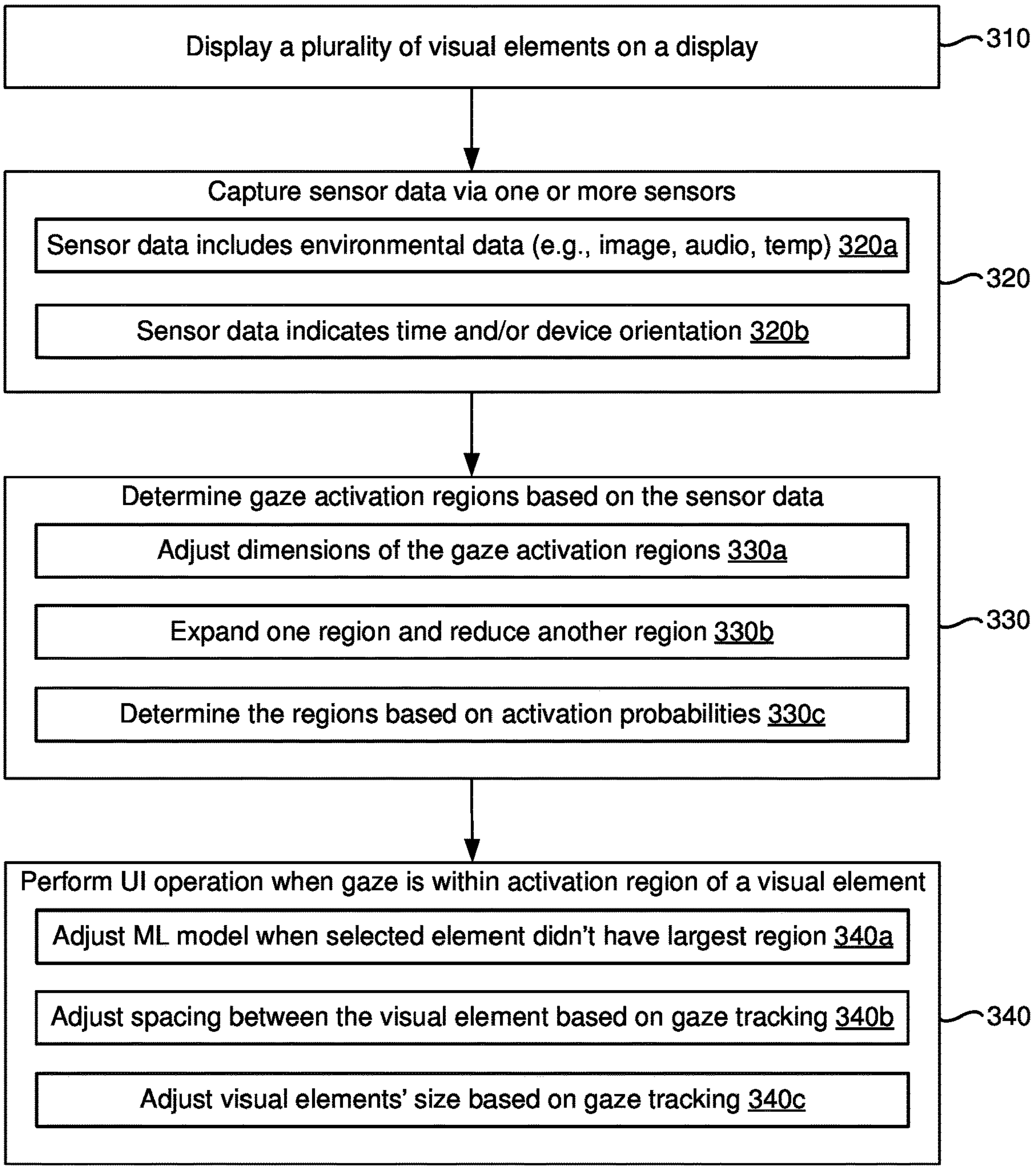
FIG. 3 is a flowchart representation of a method of determining gaze activation regions for visual elements in accordance with some implementations.

FIG. 3 is a flowchart representation of a method 300 for determining a gaze activation region for a visual element based on sensor data. In various implementations, the method 300 is performed by a device including a display, a set of one or more sensors, a non-transitory memory and one or more processors coupled with the display, the set of one or more sensors and the non-transitory memory (e.g., the electronic device 20 shown in FIGS. 1A-1I and/or the system 200 shown in FIG. 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes displaying, on the display, a plurality of visual elements. For example, as shown in FIG. 1A, the electronic device 20 displays the visual elements 50. In some implementations, the method 300 includes overlaying the visual elements on an XR environment (e.g., on a pass-through of a physical environment). In some implementations, the method 300 includes generating and displaying a user interface that includes the visual elements. In some implementations, the visual elements are selectable user interface elements (e.g., selectable affordances such as icons and/or buttons).

As represented by block 320, in various implementations, the method 300 includes capturing, by the one or more sensors, sensor data. In some implementations, the sensors capture the sensor data periodically. In some implementations, the sensors capture the sensor data when there is a change in the display of the visual elements. For example, the device can capture the sensor data when the device is in the process of rendering new visual elements in order to determine the gaze activation regions for the new visual elements.

As represented by block 320*a*, in some implementations, the one or more sensors include an environmental sensor and the sensor data includes environmental data. For example, as described in relation to FIG. 1F, the sensor 24 includes an environmental sensor that detects a characteristic of a physical environment of the device, the sensor data 26 includes the environmental data 26*c*, and the electronic device 20 determines the gaze activation regions 138*a*, . . . , and 138*f* based on the environmental data 26*c*. Examples of the environmental sensor include an image sensor, a depth sensor, an audio sensor, a temperature sensor, a humidity sensor, a motion sensor, a location sensor, or the like.

In some implementations, the one or more sensors include an image sensor and the sensor data includes image data captured by the image sensor. For example, as described in relation to FIG. 1D, the sensor 24 includes one or more image sensors that capture the image data 26*a*, and the electronic device 20 determines the gaze activation regions 110*a*, 110*b* and 110*c* based on the image data 26*a*. In some implementations, the image sensor captures the image data automatically (e.g., without requiring a user input that corresponds to a request to capture the image data) after obtaining informed consent from the user. Alternatively, in some implementations, the image sensor captures the image data in response to a user input.

In some implementations, the image sensor includes a scene-facing image sensor and the image data depicts a portion of a physical environment surrounding the device. For example, the image sensor may include a rear-facing camera of a smartphone or a tablet. In some implementations, the image sensor includes a user-facing image sensor and the image data depicts a portion of a face of a user of the device. For example, the image sensor may include a front-facing camera of a smartphone or a tablet.

In some implementations, the one or more sensors include an audio sensor and the sensor data includes audible signal data that corresponds to an audible signal received at the audio sensor. For example, as described in relation to FIG. 1E, the sensor 24 includes a microphone that receives an audible signal and the sensor data 26 includes the audible signal data 26*b*, and the electronic device 20 determines the gaze activation regions 128*a*, . . . , and 128*e* based on the audible signal data 26*b*. In some implementations, the method 300 includes continuously capturing the audible signal data after obtaining informed consent from the user. In some implementations, the audible signal data corresponds to a voice input provided by the user.

In some implementations, the one or more sensors include a location sensor and the sensor data includes a geographical location of the device. For example, as described in relation to FIG. 2, in some implementations, the sensor data 26 indicates the geographical location 26*d* of the device, and the gaze activation region determiner 230 determines the gaze activation regions 232 based on the geographical location 26*d*. In some implementations, the user is more likely to select a particular visual element when the geographical location of the device is within a geolocated fence and/or outside another geolocation fence. For example, the user may be more likely to select an icon for a maps application when the device is more than a threshold distance from a home location (e.g., when the user is traveling to a destination away from home).

As represented by block 320*b*, in some implementations, the one or more sensors include a time sensor and the sensor data indicates a current time. For example, as described in relation to FIG. 2, in some implementations, the sensor data 26 indicates the current time 26*e*, and the gaze activation region determiner 230 determines the gaze activation regions 232 based on the current time 26*e*. In some implementations, the user is more likely to select a particular visual element when a current time is within a threshold time duration. For example, the user may be more likely to select an icon for a video streaming application in the evening or outside of the user's normal working hours.

In some implementations, the one or more sensors include an orientation sensor and the sensor data indicates a current orientation of the device. For example, as described in relation to FIG. 2, in some implementations, the sensor data 26 indicates the device orientation 26*f*, and the gaze activation region determiner 230 determines the gaze activation regions 232 based on the device orientation 26*f*. In some implementations, the user is more likely to select a particular visual element when the device orientation 26*f* is horizontal. For example, the user may be more likely to select an icon for a video streamlining application when the device orientation 26*f* is horizontal.

As represented by block 330, in various implementations, the method 300 includes determining respective gaze activation regions for the plurality of visual elements based on the sensor data. For example, as shown in FIG. 1B, the electronic device 20 determines the gaze activation regions 60 for the visual elements 50 based on the sensor data 26. As another example, as described in relation to FIG. 2, the gaze activation region determiner 230 determines the gaze activation regions 232 based on the sensor data 26 obtained by the data obtainer 220. In some implementations, the method 300 includes changing a default dimension of a gaze activation region based on the sensor data. In some implementations, method 300 includes setting a gaze activation region such that the gaze activation region spans a different area (e.g., a larger area) than its corresponding visual element.

As represented by block 330*a*, in some implementations, determining the respective gaze activation regions includes adjusting dimensions of the respective gaze activation regions based on the sensor data. For example, as described in relation to FIGS. 1A and 1B, the electronic device 20 expands the dimensions of the second gaze activation region 60*b* and the third gaze activation region 60*c* based on the sensor data 26.

As represented by block 330*b*, in some implementations, determining the respective gaze activation regions includes expanding a first one of the gaze activation regions for a corresponding first one of the plurality of visual elements while reducing a second one of the gaze activation regions for a corresponding second one of the plurality of visual elements. In various implementations, the electronic device determines the gaze activation regions such that the gaze activation regions of different visual elements do not overlap. As such, expanding the gaze activation region of one visual element may require reducing the gaze activation region of another visual element.

As represented by block 330*c*, in some implementations, determining the respective gaze activation regions includes determining respective activation probabilities for the plurality of visual elements based on the sensor data, and determining the respective gaze activation regions based on the respective activation probabilities. For example, as described in relation to FIG. 2, the activation probabilities determiner 234 determines the activation probabilities 236 based on the sensor data 26, and the gaze activation region determiner 230 determines the gaze activation regions 232 based on the activation probabilities 236.

In some implementations, determining the respective gaze activation regions includes setting dimensions of the respective gaze activation regions for the plurality of visual elements to be directly proportional to the respective activation probabilities for the plurality of visual elements. For example, referring to FIG. 1B, the electronic device 20 sets the third gaze activation region 60*c* to be the largest of the gaze activation regions 60 because the third visual element 50*c* may have the greatest activation probability of the visual elements 50. Referring still to FIG. 1B, the electronic device 20 sets the second gaze activation region 60*b* to be the second largest of the gaze activation regions 60 because the second visual element 50*b* may have the second greatest activation probability of the visual elements 50.

In some implementations, determining the respective activation probabilities includes determining the respective activation probabilities in response to detecting a change in the sensor data relative to previously-captured sensor data. For example, the electronic device may adjust the dimensions or shapes of the gaze activation regions in response to detecting a visual change in a physical environment of the device, an audible change in the physical environment, a change in a geographical location of the device, a change in time and/or a change in an orientation of the device. Advantageously, the electronic device can adapt the gaze activation regions based on changing conditions of the physical environment thereby making it easier for the user to select an intended visual element via gaze.

In some implementations, determining the respective activation probabilities includes determining the respective activation probabilities based on physical entities in a physical environment of the device. Example physical entities includes physical articles such as a couch or a table, and people (e.g., the people represented by the XR representations 102 and 104 shown in FIG. 1D). As an example, referring to FIG. 1D, the electronic device 20 increases the gaze activation region 110*b* for the kids playlist affordance 108*b* in response to detecting the kids represented by the XR representations 102 in FIG. 1D. As another example, the device can increase a gaze activation region of a camera affordance when a picture-worthy entity is in a field-of-view of the device, for example, when a monument or a famous person is in the field-of-view of the camera of the device.

In some implementations, determining the respective activation probabilities includes determining the respective activation probabilities based on audible signal data corresponding to a physical environment of the device. For example, referring to FIG. 1E, the electronic device 20 increases the gaze activation regions 128*d* and 128*e* of the volume affordances 126*d* and 126*e*, respectively, when the sound level 80 of the physical environment 10 is greater than the sound threshold 82.

In some implementations, determining the respective activation probabilities includes determining the respective activation probabilities based on a lighting level of a physical environment of the device. For example, referring to FIG. 1G, the electronic device 20 increases the gaze activation region 138*b* of the light switch 136*b* when the current ambient lighting level 144 is less than the threshold lighting level 146. In some implementations, the light switch 136*b* is for controlling a physical light in the physical environment. In some implementations, the light switch 136*b* is a flashlight affordance for controlling a flashlight integrated into the device.

In some implementations, determining the respective activation probabilities includes determining the respective activation probabilities based on an environmental condition of a physical environment of the device. For example, referring to FIG. 1F, the electronic device 20 increases the gaze activation region 138*e* of the increase temperature affordance 136*e* when the current temperature 140 is less than the target temperature 142.

In some implementations, determining the respective activation probabilities includes determining the respective activation probabilities based on a geographical location of the device. For example, as shown in FIG. 2, in some implementations, the sensor data 26 indicates the geographical location 26*d* and the gaze activation region determiner 230 determines the gaze activation regions 232 based on the geographical location 26*d*. As an example, the device may increase a gaze activation region of a maps application icon when the device is located in a geographical location that is distant from a home location of the device (e.g., when the user is travelling to a new geographical location and the user may require the maps application to navigate through the new geographical location).

In some implementations, determining the respective activation probabilities includes determining the respective activation probabilities based on a current time. For example, as shown in FIG. 2, in some implementations, the sensor data 26 indicates the current time 26*e* and the gaze activation region determiner 230 determines the gaze activation regions 232 based on the current time 26*e*. As an example, the device increases gaze activation regions of icons for applications related to personal use outside of normal working hours. For example, the device can increase the gaze activation region of an icon for a streaming application and reduce the gaze activation region for a project management application outside of normal working hours.

As represented by block 340, in various implementations, the method 300 includes, in response to a measured gaze target being within one of the respective gaze activation regions, performing a user interface operation associated with a corresponding one of the plurality of visual elements. For example, as described in relation to FIG. 2, the content presenter 210 performs the user interface operation 244 associated with a particular visual element 212 when the measured gaze target 242 is within the gaze activation region 232 of that particular visual element 212. In some implementations, the UI operation may be performed further in response to a selection indication, such as a gesture, audio command, other device input, or the like, while the measured gaze target is within one of the respective gaze activation regions. For example, the device may perform the UI operation associated with an affordance after detecting a gaze input that is directed to the affordance and detecting a non-gaze input (e.g., a gesture input such as a head nod, a voice input, etc.) that confirms the gaze input. Performing the UI operation in response to detecting the gaze input and non-gaze input that confirms the gaze input helps in reducing inadvertent activations of the affordance.

As represented by block 340*a*, in some implementations, a machine-learned model determines the respective gaze activation regions. In some implementations, the method 300 includes adjusting one or more parameters of the machine-learned model in response to the measured gaze target being outside a largest one of the respective gaze activation regions. For example, the device can re-calibrate the machine-learned model so that when subsequent sensor data is within a similarity threshold of current sensor data, the machine-learned model sets a gaze activation region of a currently selected visual element to be largest gaze activation region. Advantageously, the device can utilize non-gaze inputs (e.g., touch inputs, gesture inputs or voice inputs) to increase a performance of the machine-learned model that predicts which of the visual elements the user is most likely to select based on the sensor data.

As represented by block 340*b*, in some implementations, the method 300 includes adjusting a spacing between the plurality of visual elements based on a confidence score associated with the measured gaze target and/or based on the sensor data. In some implementations, the confidence score associated with the measured gaze target is a function of an accuracy and/or a reliability of the device's ability to track a gaze of the user. For example, as shown in FIG. 1I, the electronic device 20 displays the affordances 136*a*, . . . , and 136*f* with the increased spacing 150 when the gaze tracking performance 34 is less than the performance threshold 36. As another example, the device can increase the spacing towards the end of a day when the user may be more tired. As another example, the device can increase the spacing when the device is moving (e.g., when the user may be walking or jogging). In some implementations, the spacing is equal to or greater than a gaze cone indicated by the confidence score. For example, as shown in FIG. 1I, the increased spacing 150 is greater than the diameter 156 of the gaze cone 154.

As represented by block 340*c*, in some implementations, the method 300 includes adjusting respective sizes of the visual elements based on a confidence score associated with the measured gaze target and/or based on the sensor data. For example, as shown in FIG. 1H, the electronic device 20 increases a size of the light switch 136*b*. In some examples, the device increases the size of one or more visual elements based on an accuracy and/or a reliability of the device's ability to track a gaze of the user (e.g., when the gaze tracking performance 34 is below the performance threshold 36 shown in FIG. 1A). In some implementations, the device increases a size of the visual element(s) based on a time of day, for example, the device increases the respective sizes towards the end of the day when the user may be more tired. In some implementations, the respective sizes are greater than a gaze cone indicated by the confidence score. For example, referring to FIG. 1I, the size of the affordances 136*a*, . . . , and 136*f* is greater than the diameter 156 of the gaze cone 154.

In some implementations, capturing the sensor data includes detecting user inputs over a period of time. In some implementations, the method 300 includes identifying a usage pattern based on the user inputs detected over the period of time. In some implementations, the method 300 includes determining the respective gaze activation regions for the plurality of visual elements based on the usage pattern. As an example, the usage pattern may indicate that a user tends to select a close affordance for a media player after selecting a play affordance and watching a media content item being played for a certain amount of time (e.g., the usage pattern may indicate that the user tends to close a video after watching about 30 seconds of the video). In this example, the device can increase a gaze activation region of the close affordance after the video has played for 30 seconds in order to make it easier for the user to close the video after watching about 30 seconds of the video. As another example, the usage pattern may indicate that the user most frequently opens a music application after closing a fitness application. In this example, the device can increase a gaze activation region for an icon of the music application after detecting the fitness application being closed in order to make it easier for the user to open the music application.

Figure 4:
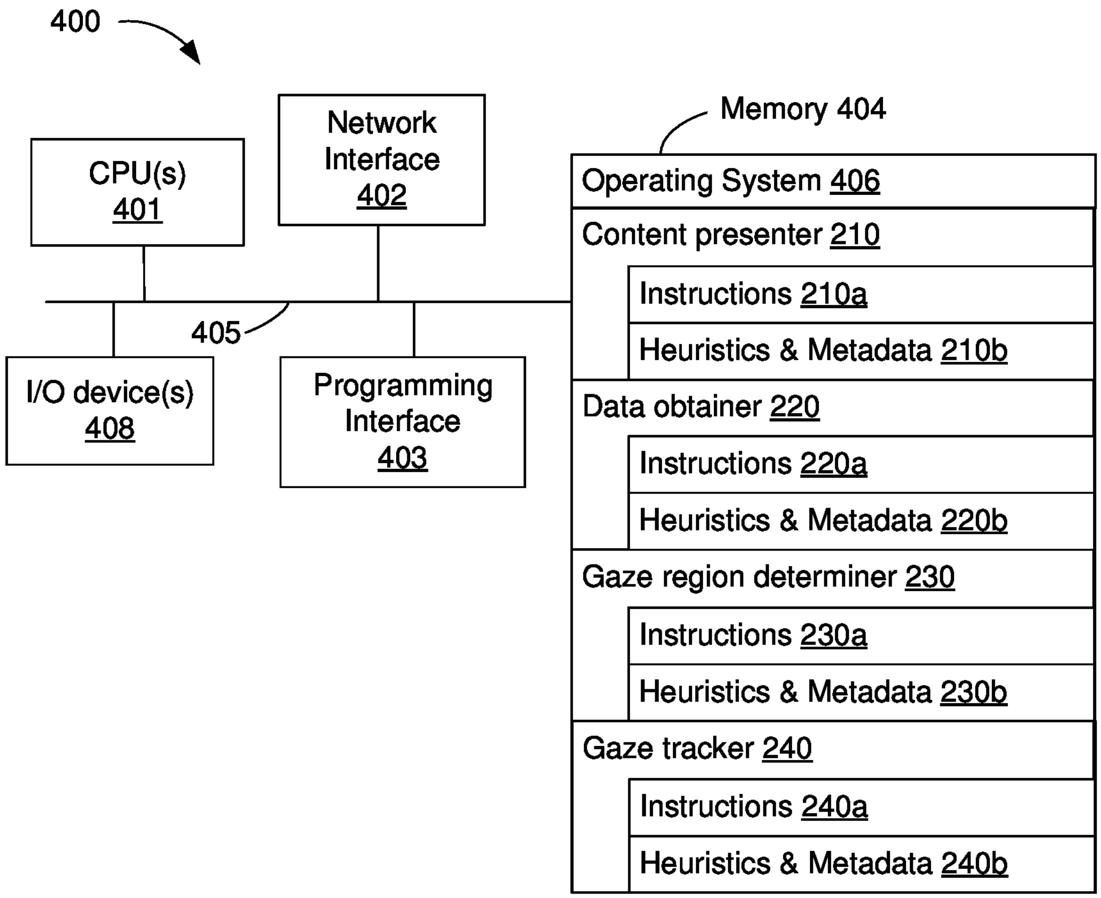
FIG. 4 is a block diagram of a device that determines gaze activation regions for visual elements in accordance with some implementations.

FIG. 4 is a block diagram of a device 400 in accordance with some implementations. In some implementations, the device 400 implements the electronic device 20 shown in FIGS. 1A-1I and/or the system 200 shown in FIG. 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 408, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the content presenter 210, the data obtainer 220, the gaze activation region determiner 230 and the gaze tracker 240. In various implementations, the device 400 performs the method 300 shown in FIG. 3.

In some implementations, the content presenter 210 includes instructions 210*a*, and heuristics and metadata 210*b* for displaying visual elements (e.g., the visual elements 50 shown in FIGS. 1A-1C) and displaying performance of user interface operations (e.g., the user interface operation 244 shown in FIG. 2). In some implementations, the content presenter 210 performs at least some of the operation(s) represented by block 310 and 340 in FIG. 3.

In some implementations, the data obtainer 220 instructions 220*a*, and heuristics and metadata 220*b* for obtaining sensor data (e.g., the sensor data 26 shown in FIGS. 1B-2). In some implementations, the data obtainer 220 performs at least some of the operation(s) represented by block 320 in FIG. 3.

In some implementations, the gaze activation region determiner 230 includes instructions 230*a*, and heuristics and metadata 230*b* for determining gaze activation regions for the visual elements (e.g., the gaze activation regions 60 shown in FIGS. 1A-1C). In some implementations, the gaze activation region determiner 230 performs at least some of the operation(s) represented by block 330 in FIG. 3.

In some implementations, the gaze tracker 240 includes instructions 240*a*, and heuristics and metadata 240*b* for determining a measured gaze target (e.g., the measured gaze target 32 shown in FIGS. 1A and 1B). In some implementations, the gaze tracker 240 performs at least some of the operation(s) represented by block 340 in FIG. 3.

In some implementations, the one or more I/O devices 408 include an input device for obtaining an input. In some implementations, the input device includes a touchscreen (e.g., for detecting tap inputs), an image sensor (e.g., for detecting gesture inputs) and/or a microphone (e.g., for detecting voice inputs). In some implementations, the one or more I/O devices 408 include a set of one or more sensors (e.g., the sensor 24 shown in FIGS. 1A-1I) for capturing sensor data (e.g., the sensor data 26 shown in FIGS. 1A-2). In some implementations, the one or more I/O devices 408 include one or more image sensors (e.g., a user-facing camera for capturing images of a pupil of the user, and/or a scene-facing camera for capturing scene images) for capturing image data (e.g., the image data 26*a* shown in FIG. 2). In some implementations, the one or more I/O devices 408 include an audio sensor for receiving audible signals and converting the audible signals to audible signal data (e.g., the audible signal data 26*b*). In some implementations, the one or more I/O devices 408 include an environmental sensor that detects an environmental characteristic of a physical environment and generates environmental data (e.g., the environmental data 26*c*). In some implementations, the one or more I/O devices 408 include a location sensor that detects the geographical location 26*d* shown in FIG. 2. In some implementations, the one or more I/O devices 408 include a clock that identifies the current time 26*e* shown in FIG. 2. In some implementations, the one or more I/O devices 408 include an orientation sensor (e.g., an inertial measurement unit (IMU)) that captures the device orientation 26*f* shown in FIG. 2. In some implementations, the one or more I/O devices 408 include a display for displaying the visual elements (e.g., the visual elements 50 shown in FIGS. 1A-1C).

In various implementations, the one or more I/O devices 408 include a video pass-through display which displays at least a portion of a physical environment surrounding the device 400 as an image captured by a camera (e.g., for displaying the XR environment 100 shown in FIG. 1D). In various implementations, the one or more I/O devices 408 include an optical see-through display which is at least partially transparent and passes light emitted by or reflected off the physical environment.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

Implementations described herein contemplate the use of gaze information to present salient points of view and/or salient information. Implementers should consider the extent to which gaze information is collected, analyzed, disclosed, transferred, and/or stored, such that well-established privacy policies and/or privacy practices are respected. These considerations should include the application of practices that are generally recognized as meeting or exceeding industry requirements and/or governmental requirements for maintaining the user privacy. The present disclosure also contemplates that the use of a user's gaze information may be limited to what is necessary to implement the described embodiments. For instance, in implementations where a user's device provides processing power, the gaze information may be processed at the user's device, locally.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:

at a device including a display, a gaze tracker, one or more environmental sensors, a non-transitory memory and one or more processors coupled with the display, the gaze tracker, the one or more sensors, and the non-transitory memory:

displaying, on the display, a plurality of visual elements;

capturing, by the one or more environmental sensors, environmental data including a lighting level of a physical environment of the device;

in response to determining that a current performance of the gaze tracker is below a performance threshold, adjusting respective gaze activation regions for selecting the plurality of visual elements based on the lighting level;

measuring, using the gaze tracker, a gaze target; and in response to the gaze target being within one of the respective gaze activation regions, performing a user interface operation associated with a corresponding one of the plurality of visual elements.

2. The method of claim 1, wherein the one or more environmental sensors include an image sensor and the environmental data includes image data captured by the image sensor.

3. The method of claim 2, wherein the image sensor includes a scene-facing image sensor and the image data depicts a portion of a physical environment surrounding the device.

4. The method of claim 1, wherein the one or more environmental sensors include an audio sensor and the environmental data includes audible signal data that corresponds to an audible signal received at the audio sensor.

5. The method of claim 1, wherein the one or more environmental sensors include a location sensor and the environmental data includes a geographical location of the device.

6. The method of claim 1, wherein the one or more environmental sensors include a time sensor and the environmental data indicates a current time.

7. The method of claim 1, wherein the one or more environmental sensors include an orientation sensor and the environmental data indicates a current orientation of the device.

8. The method of claim 1, wherein adjusting the respective gaze activation regions comprises adjusting dimensions of the respective gaze activation regions based on the sensor data.

9. The method of claim 1, wherein adjusting the respective gaze activation regions comprises:

expanding a first one of the gaze activation regions for selecting a corresponding first one of the plurality of visual elements while reducing a second one of the gaze activation regions for a corresponding second one of the plurality of visual elements.

10. The method of claim 1, wherein adjusting the respective gaze activation regions comprises:

determining respective activation probabilities for the plurality of visual elements based on the environmental data; and adjusting the respective gaze activation regions based on the respective activation probabilities.

11. The method of claim 10, wherein adjusting the respective gaze activation regions comprises:

setting dimensions of the respective gaze activation regions for the plurality of visual elements to be directly related to the respective activation probabilities for the plurality of visual elements.

12. The method of claim 1, wherein adjusting the respective gaze activation regions comprises:

adjusting the respective gaze activation regions in response to detecting a change in the environmental data relative to previously-captured environmental data.

13. The method of claim 1, wherein adjusting the respective gaze activation regions comprises adjusting the respective gaze activation regions based on physical entities in a physical environment of the device.

14. The method of claim 1, wherein adjusting the respective gaze activation regions comprises adjusting the respective gaze activation regions based on audible signal data corresponding to a physical environment of the device.

15. The method of claim 1, wherein adjusting the respective gaze activation regions comprises adjusting the respective gaze activation regions based on an environmental condition of a physical environment of the device.

16. A device comprising:

one or more processors;

one or more environmental sensors;

a gaze tracker;

a display;

a non-transitory memory; and one or more programs stored in the non-transitory memory, which, when executed by the one or more processors, cause the device to:

display, on the display, a plurality of visual elements;

capture, by the one or more environmental sensors, environmental data including a lighting level of a physical environment of the device;

in response to determining that a current performance of the gaze tracker is below a performance threshold, adjust respective gaze activation regions for selecting the plurality of visual elements based on the lighting level;

measuring, using the gaze tracker, a gaze target; and in response to the gaze target being within one of the respective gaze activation regions, perform a user interface operation associated with a corresponding one of the plurality of visual elements.

17. A non-transitory memory storing one or more programs, which, when executed by one or more processors of a device including a display, a gaze tracker, and one or more environmental sensors, cause the device to:

display, on the display, a plurality of visual elements;

capture, by the one or more environmental sensors, environmental data including a lighting level of a physical environment of the device;

in response to determining that a current performance of the gaze tracker is below a performance threshold, adjust respective gaze activation regions for selecting the plurality of visual elements based on the lighting level;

measuring, using the gaze tracker, a gaze target; and in response to the gaze target being within one of the respective gaze activation regions, perform a user interface operation associated with a corresponding one of the plurality of visual elements.

* * * * *